(No Model.)
B. GALLAGHER.
CORK SHELL CUTTING MACHINE.
No. 257,311. Patented May 2, 1882.
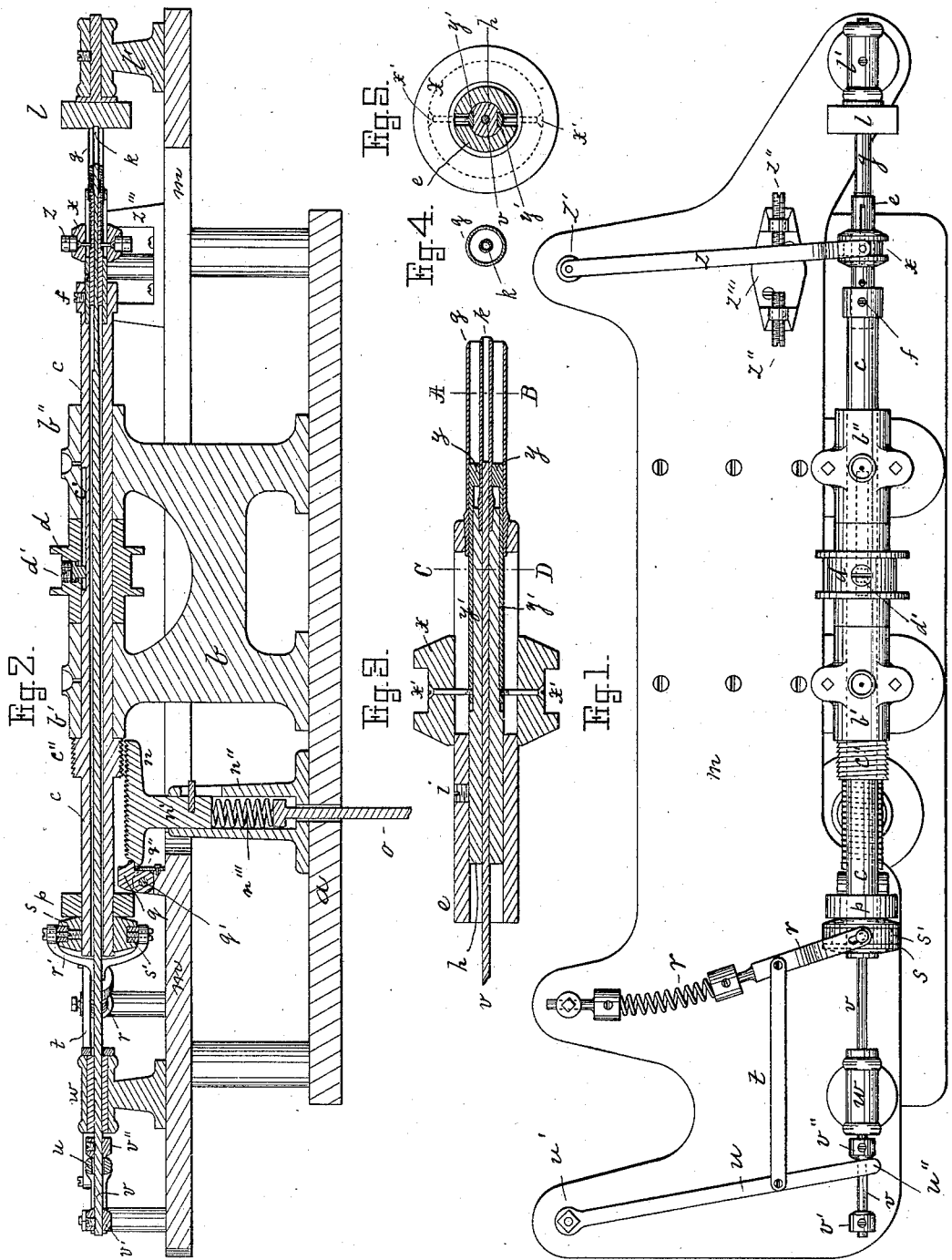
Witnesses:
Henry Chadbourn.
F. Allen.
Inventor:
Bernard Gallagher
by Alban Andrew
his atty.
N. PETERS, Photo-Lithographer, Washington, D. C.

UNITED STATES PATENT OFFICE.

BERNARD GALLAGHER, OF LYNN, MASSACHUSETTS, ASSIGNOR, BY MESNE ASSIGNMENTS, TO ETHEL C. HINE, OF BROOKLYN, NEW YORK, AND FRANK M. ELKINS, OF WASHINGTON, DISTRICT OF COLUMBIA.

CORK-SHELL-CUTTING MACHINE.

SPECIFICATION forming part of Letters Patent No. 257,311, dated May 2, 1882.

Application filed June 6, 1881. (No model.)

*To all whom it may concern:*

Be it known that I, BERNARD GALLAGHER, a citizen of New Brunswick, residing at Lynn, in the county of Essex and State of Massachusetts, have invented certain new and useful Improvements in Cork-Shell-Cutting Machines; and I do hereby declare that the same are fully described in the following specification and illustrated in the accompanying drawings.

This invention relates to improvements in machines for cutting cork shells adapted to serve as mouth-pieces for cigarettes or other purposes; and it is carried out as follows, reference being had to the accompanying drawings, on which—

Figure 1 represents a plan view of the machine. Fig. 2 represents a central longitudinal section of the same. Fig. 3 represents an enlarged longitudinal section of the hollow cutters and the hollow shafts to which they are secured. Fig. 4 represents a cross-section on the line A B, shown in Fig. 3; and Fig. 5 represents a cross-section on the line C D, also shown in Fig. 3.

Similar letters refer to similar parts wherever they occur on the different parts of the drawings.

$a$ is the base-plate of the machine, to which is secured the standard $b$, having bearings $b'$ and $b''$ in its upper end, in which the hollow shaft $c$ is supported in such a manner as to allow of its rotation, as well as longitudinal sliding motion, within said bearings.

Between the bearings $b'$ $b''$ is located, on the shaft $c$, the cord or belt pulley $d$, provided with a projection, $d'$, that is screwed through the said pulley, so that its inner end projects into a longitudinal groove, $c'$, on the main shaft $c$, by which arrangement the shaft $c$ may be moved longitudinally forward and back in its bearings, as well as rotated around its axis.

$e$ is a hollow sleeve, secured by means of the adjustable set-screw $f$ to the forward end of the hollow main shaft $c$.

$g$ is the outer cylindrical cutter, by means of which the exterior of the cork shell is cut, and said cutter is secured in a suitable manner to the forward end of the hollow sleeve $e$, as shown in Fig. 3.

$h$ is a secondary hollow sleeve, located within the sleeve $e$, within which it is adjustable, and to which it is secured, after being adjusted, by means of a set-screw, $i$.

$k$ is the inner cylindrical cutter, by means of which the central perforation in the cork shell is cut, and said cutter $k$ is secured in a suitable manner to the forward end of the sleeve $h$, as shown in Fig. 3. Both cutters $g$ and $k$ are preferably driven into tapering recesses in their respective hollow sleeves $e$ and $h$, as shown in Fig. 3.

$l$ is a stationary block of wood or other suitable material, secured to a standard, $l'$, on the frame $m$, which block $l$ serves as a rest or support for the piece of cork that is being acted upon by the rotary and longitudinally-adjustable cutters $g$ $k$ during the cutting out of the cork shells.

$c''$ is a screw-threaded collar on the main shaft $c$, located in proximity to the bearing $b'$, as shown in Fig. 2.

$n$ is a screw rack-piece located below the correspondingly screw-threaded collar $c''$, which rack-piece is provided with a shank, $n'$, that is adjustable up and down within the hollow stand $n''$, within which is located a coiled spring, $n'''$, which is acted upon by a suitable rod, $o$, from an ordinary treadle secured to the floor or lower part of the machine, such treadle being, however, not shown in the drawings. By pushing up the rack-piece $n$ so that its teeth engage with the teeth on the screw-threaded collar $c''$ the hollow main shaft $c$, during its rotation, is automatically fed forward with its cylindrical cutters $g$ and $k$ to cut the shell from the cork held against the stationary block $l$, and when the cork shell is finished a collar, $p$, at the rear end of the hollow main shaft $c$ acts upon an arm or hook, $q$, hinged at $q'$, by which the rack-piece $n$ is depressed and disengaged from the screw-collar $c''$, and the main shaft is then caused to move quickly backward by the influence of the spring $r$, secured in a suitable manner at one end to the stationary frame $m$, and provided with a forked lever, $r'$, to which is jointed a ring or portion of a ring, $s'$, resting loosely in the grooved collar $s$, secured to the extreme rear end of the hollow main shaft $c$, as shown in Figs. 1 and 2. In moving quickly backward the screw-collar $c''$ on the shaft $c$ strikes against the hook or lever $q$, causing it to be unlocked and released from the screw-rack $n$ and to be held in such position by the influence of the spring $q''$, after which the latter is again made to engage with the screw-threaded collar $c''$ by the raising of the rod $o$ by means of a suitable foot-treadle or equivalent device in its lower part, as described, by which arrangement the rotary shaft $c$, with its cutters $g$ and $k$, is again automatically fed forward to cut another shell, as heretofore described.

The lever $r'$ is connected by means of a link or rod, $t$, to a second lever, $u$, which is movable on the fulcrum $u'$, and is forked in its outer end, $u''$, where it embraces the rod $v$ between two collars, $v'$ and $v''$, these collars being firmly secured to the central rod, $v$, as shown. The rod $v$ extends through the whole of the hollow shaft $c$, as well as through the whole of the sleeve $h$, and terminates within the inner cylindrical cutter, $k$, as shown, and its object is to automatically force out the central cork core from the cutter $k$ when the cutters are drawn back from the cork sheet that is being cut, and to accomplish this the two collars $v'$ and $v''$ are placed a sufficient distance apart on the central rod, $v$, so as to allow the lever $u$, that acts upon them, to move a short distance without acting on said collars $v'$ and $v''$, the central rod, $v$, being, during that time, held stationary by the frictional resistance in the stationary bearing $w$. After the cork core is thus forced out from the cutter $k$ the central rod, $v$, is moved backward with the main shaft $c$ by the action of the lever $r'$, link $t$, and secondary lever $u$. After the core is delivered from the cutter $k$ the cork shell is forced out from the cutters $g$ and $k$ by means of the annular washer or piston $y$, located in the annular space between the cutters $g$ and $k$, as shown in Fig. 3. Said piston $y$ is made to slide loosely in the annular space above mentioned, and it is provided with a pair of backward-projecting slides, $y'$ $y'$, movable in grooves $h'$ $h'$ on the exterior of the sleeve $h$.

To the slides $y'$ $y'$ is secured the grooved collar $x$ by means of the screws $x'$ $x'$, as shown in Fig. 3. A forked lever, $z$, hung at $z'$, embraces the grooved collar $x$ with its forked end. The throw of the lever $z$ is regulated by means of the adjustable regulating-screws $z''$ $z''$ on the standard $z'''$ as shown in Fig. 1.

The delivery of the cork shells from between the outer and inner cutters is accomplished as follows: After the hollow shaft $c$ and its cutters $g$ and $k$ have receded far enough from the cork sheet to deliver the core from the inner cutter, $k$, the forked lever $z$, that is jointed to the slides $y'$ $y'$, comes in contact with one of the set-screws $z''$ and prevents them from drawing back farther and causes the piston $y$ to remain still, thus forcing out the shell by the backward motion of the hollow main shaft $c$ and its cutters $g$ and $k$.

What I desire to secure by Letters Patent, and claim, is—

1. In a cork-shell-cutting machine, the herein-described shell-delivery mechanism, consisting, in combination with the rotary and longitudinally-adjustable shaft $c$ and its cylindrical cutters $g$ and $k$, of the annular piston $y$, slides $y'$ $y'$, secured to the grooved collar $x$, the forked lever $z$, and adjustable stops $z''$ $z''$, as and for the purpose set forth.

2. In a cork-shell-cutting machine, the combination of the cylindrical hollow cutters $g$ and $k$, hollow main shaft $c$, its screw-collar $c''$, and vertically-adjustable rack-piece $n$, as and for the purpose set forth.

3. In a cork-shell-cutting machine, the combination of the hollow main shaft $c$, its screw-collar $c''$, adjustable rack-piece $n$, the hinged hook $q$, with its spring $q''$, and collar $p$ on the shaft $c$, as described.

4. In a cork-shell-cutting machine, the combination of the hollow shaft $c$, its cylindrical cutters $g$ and $k$, grooved collar $s$, ring $s'$, and spring-lever $r$ $r'$, as and for the purpose set forth.

5. In combination, the rotary and sliding shaft $c$, cutters $g$ and $k$, central rod, $v$, grooved collar $s$, ring $s'$, spring-lever $r$ $r'$, link $t$, lever $u$, and collars $v'$ $v''$ on the rod $v$, and frictional bearing $w$, as and for the purpose set forth.

In testimony whereof I have affixed my signature in presence of two witnesses.

BERNARD GALLAGHER.

Witnesses:
C. G. CLARK,
HENRY CHADBOURN.